United States Patent Office 3,439,061
Patented Apr. 15, 1969

3,439,061
CATALYTIC DEHYDROGENATION OF PARAFFINS
David W. Henderson, San Francisco, and John H. Raley, Walnut Creek, Calif., assignors to Shell Oil Company, New York, N.Y., a corporation of Delaware
No Drawing. Filed Oct. 10, 1966, Ser. No. 585,270
Int. Cl. C07c 5/20, 5/18
U.S. Cl. 260—683.3          1 Claim

ABSTRACT OF THE DISCLOSURE

Olefins are prepared by dehydrogenation of paraffins over supported catalysts containing Group VIII noble metal, which is sulfided during initial operation, the catalyst sulfur content being maintained by controlled sulfur addition during subsequent operation.

This invention relates to the dehydrogenation of paraffin hydrocarbons and in particular to the dehydrogenation of paraffin hydrocarbons by means of a supported noble metal catalyst.

Olefins having from two through five carbon atoms are widely used as starting materials for many end products. For example, it is well known to polymerize ethylene and/or propylene to high molecular weight plastics or to alkylate $C_2$–$C_5$ olefins with isoparaffins for high octane gasoline components.

Olefins can be produced from paraffins by a number of well known methods such as by cracking, halogenation-dehydrohalogenation and catalytic dehydrogenation. As each of the methods has various disadvantages, search has continued for a suitable process, and especially a catalytic dehydrogenation process to help meet the steadily increasing demand for olefins. Catalytic dehydrogenation of paraffins is described by K. K. Kearly in Catalysis (P. H. Emmett, Ed.) Reinhold Publishing Corp., New York, 1955, vol. III, Ch. 10, p. 453.

Of the many dehydrogenation catalysts known, it is generally considered that alumina-chromia catalysts are about the most satisfactory for dehydrogenating paraffins to olefins. Recently it has been proposed to dehydrogenate paraffins to olefins by means of Group VIII metal on alumina which has been modified by the incorporation of alkali metal compound into the catalyst (see Turnquest et al., U.S. 3,126,426, issued Mar. 24, 1964).

It has now been discovered that paraffins can be dehydrogenated to olefins by means of certain noble metal catalysts having high activity, stability and selectivity. In accordance with the present invention, the paraffin to be dehydrogenated is contacted under hydrogenation conditions with a sulfided Group VIII noble metal catalyst. Advantageously, the dehydrogenation is effected in the presence of minor amounts of sulfur. This is surprising since noble metals such as platinum are considered to be very strong hydrogenation-dehydrogenation catalysts when in the reduced form.

The catalyst employed in the process of the invention comprises a minor amount, e.g. 0.01–5% w. of one or more Group VIII noble metals, i.e. platinum, palladium, rhodium, ruthenium, osmium and iridium. The preferred metals are iridium, palladium and platinum, with platinum being particularly preferred. If desired, other transition metals having dehydrogenation activity can be incorporated into the catalyst together with the noble metal.

The noble metal advantageously is supported on a porous refractory oxide carrier such as silica, alumina, magnesia and the like or mixtures thereof. These carriers are widely available commercially and their preparation is well known. Preferred carriers are alumina, silica-magnesia and silica, with silica being especially preferred. Advantageously, the silica has a high surface area, i.e. a surface area of about 300 to 750 sq. m./g.

Any suitable method for adding the metal component to the refractory oxide support can be used. Highly suitable catalysts can be prepared by impregnating the noble metal on the support, or ion-exchanging metal with the support. Any suitable metal compound, preferably water soluble, can be used. For example, to prepare the preferred platinum catalysts, suitable platinum compounds which can be used include chloroplatinic acid, platinous tetramine compounds such as platinous tetramine chloride, platinous tetramine nitrate or platinous tetramine hydroxide. Alternatively, the metal component can be provided by mixing an aqueous dispersion of a sulfide such as platinum sulfide with the refractory oxide. After addition of the metal compound, the catalyst is usually dried and preferably is calcined in air. A calcination temperature in the range from about 300–450° C. is highly advantageous, although higher or lower temperatures can be used if desired.

The catalyst is sulfided to provide high activity, stability and selectivity. Sulfiding can be carried out in a known manner, such as by passing a mixture of hydrogen and hydrogen-sulfide over the catalyst at a temperature of about 300–400° C. for a suitable length of time. Alternatively, the catalyst can be sulfided by adding sulfur, hydrogen sulfide, or a decomposable sulfur compound such as mercaptans, disulfides, thiophene and the like to the feed. Suitable concentrations of sulfur range from about 50 to 10,000 p.p.m. by weight sulfur based on the hydrocarbon. Preferably, rather high concentrations of sulfur, e.g. from about 3,000 p.p.m. to 6,000 p.p.m., are used. A convenient and preferred method is to sulfide the catalyst as it is being heated to the desired operating temperature. Advantageously, the paraffin dehydrogenation is effected in the presence of similar concentrations of sulfur. After the initial sulfiding operation, it is preferred to adjust the concentration of sulfur to a level of about 300 to 2,000 p.p.m. by weight.

The catalyst is ordinarily used in granular or pelleted form in fixed beds. Fairly uniform particles of about $\frac{1}{16}$ to about $\frac{3}{8}$ inch in sizes are satisfactory. If desired, the dehydrogenation may be effected with finely divided catalyst to provide a fluidized catalytic process.

Dehydrogenation of paraffins to olefins is carried out at a temperature in the range from about 400–700° C. and preferably from about 500–650° C. for the lower paraffins. In general, the pressure is relatively low and can be in the range from a subatmospheric pressure of about 0.1 atm. to an elevated pressure of about 3 atm. or more. Preferred pressures are in the range from about 0.3 atm. to 2 atm. Weight hourly space velocity can vary over a considerable range, such as from about 0.1 to about 20 and preferably from about 1 to 5.

There is a net production of hydrogen in the dehydrogenation reaction. Nevertheless, it appears that the presence of added hydrogen is beneficial to catalyst stability. The molar ratio of hydrogen to hydrocarbon can vary from as low as about 0.1:1 to as high as 5:1, although lower and higher ratios can be used if desired. Recycle hydrogen can be used.

While paraffins which can be dehydrogenated by the process of the invention comprise paraffins ranging from $C_2$–$C_{20}$, individually or in a mixture, the process of the invention is particularly suitable for lower paraffins, e.g. $C_2$ through $C_5$ paraffins. The lower paraffins are generally considered to be more difficult to dehydrogenate than higher molecular weight paraffins. The paraffin can also be in admixture with other hydrocarbons. Suitable feeds can range from ethane, propane, or other individual hydrocarbon fractions available in a petroleum refinery to mixed hydrocarbon fractions comprising 60% v., preferably 70% v. or more paraffins. The paraffin is dehydrogenated to the corresponding olefin. For example, propane, butane, pentane and cyclopentane are dehydrogenated primarily to propylene, butylene, amylene and cyclopentene, respectively, with a minor amount being cracked to lower hydrocarbons. The olefins can be recovered from the dehydrogenation zone effluent by suitable means known in the art.

The following examples illustrate the process of the invention and its advantages.

Example I

A platinum catalyst was prepared by impregnating silica (Davison grade 950, 600–700 sq. m./g.) with an aqueous solution of chloroplatinic acid. Sufficient platinum compound was employed to provide 1% w. Pt in the final catalyst. The volume of water employed in the solution was about equal to the total pore volume of the support. The impregnated catalyst was dried under vacuum (1 mm. to 200 mm. Hg) in a rotary evaporator at 100° C. and calcined in air at 385° C. for 1.5–2.0 hours.

This catalyst, with and without sulfiding, was tested for the dehydrogenation of propane over a 22 hour process period at 595° C., 1 atmosphere pressure (absolute), WHSV of 2.0, and hydrogen/propane mole ratio of 0.083. The catalyst was treated with dimethyl sulfide added to the hydrogen/propane mixture during the heat-up period and during about the first hour of the process period at a concentration of 620 p.p.m. S, after which the dimethyl sulfide injection was reduced to provide 680 p.p.m. S for the remainder of the process period. With the sulfided catalyst, selectivity to propylene after a process period of 3–4 hours was 90–95%. Propylene yield declined from a high of 44.0% by weight to a low of 36.5% over the entire process period. Without sulfur, selectivity to propylene was only 75–80% during the corresponding period and propylene yield declined from 30.4% to a low of 18.6% over the entire period. Thus, it clearly can be seen that sulfur results in improved activity, stability and selectivity.

Example II

A similar experiment was conducted with a catalyst of 1% w. platinum on alumina. The catalyst was prepared in the manner described in Example I by impregnating $H_2PtCl_6$ onto alumina (Alcoa F-20, 250 sq. m./g.) containing 0.77% w. potassium. Calcination was effected in air at 385° C. for 1.5–2.0 hours.

The catalyst, with and without sulfiding, was tested for the dehydrogenation of propane as described in Example I, except that the hydrogen/propane mol ratio was 0.25 and a three hour process period was used. With the sulfided catalyst, the maximum yield of propylene was 39.2% by weight, and minimum yield was 35.7% over the period. Selectivity to propylene at the end of the period was 94%. In contrast, without sulfur, the maximum propylene yield was 33.7% and minimum yield was 25.6%, with selectivity at the end of the period being 88%. Again it can be seen that the effect of sulfur is to improve activity, stability and selectivity. It is also to be noted that despite the presence of the alkali metal, the catalyst was not as active as the silica-based catalyst of Example I.

Example III

A fresh portion of sulfided platinum catalyst, described in Example I, was tested for the dehydrogenation of isobutane. The dehydrogenation was carried out over a 21 hour process period at 595° C., 1 atmosphere pressure, 2.7 WHSV, and hydrogen/isobutane mol ratio of 0.33. The average isobutylene yield for the period was 50.1% by weight.

Example IV

This example demonstrates the effect of calcination temperature on a catalyst of 1% Pt on silica (Davison grade 950), prepared as described in Example I. The catalyst was given a high temperature calcination (550° C.) and compared with a catalyst which had not been calcined. Each catalyst was sulfided and tested for the dehydrogenation of propane as described in Example I. With the catalyst which had not been calcined, propylene yield declined from a high of 43.5% w. to a low of 22.2% w. over a 20 hour process period. With the catalyst calcined at 550° C., propylene yield declined from 36.5% w. to a low of 12.0% w. over a 24 hour process period. These results, compared with those in Example I indicate that a moderate temperature calcination such as that given in Example I is more advantageous.

Example V

An experiment similar to that described in Example I was conducted with a catalyst of 1% w. iridium on silica (Davison grade 950). This catalyst was prepared in a similar manner to that described in Example I by impregnating $H_2IrCl_6$ onto the silica. Calcination was effected in air at 385° C. for 1.5–2.0 hours.

The catalyst, with sulfiding, was tested for the dehydrogenation of propane as described in Example I. The average propylene yield obtained over a 22 hour process period was 26.5% by weight, declining from a high of 36.0% to a low of 22.0%. The selectivity to propane was 90% after 3 hours of the process period.

Example VI

In this example, a catalyst comprising 0.4% w. palladium on alumina was pretreated by reduction in hydrogen at 300° C., further heated in hydrogen to 400° C., and slowly heated in hydrogen plus helium containing thiophene. A mixture comprising propane, hydrogen and helium (2.5/0.5/1.0 gas volume proportion, respectively) was passed over the catalyst at 605° C., 1 atmosphere (absolute) and 2.5 LHSV, with 1000 p.p.m. S (added as thiophene in the helium). At the end of 30 minutes, yield of propylene was 19.5% w., with 1.5% w. $C_1$–$C_2$. Sulfur concentration was increased to 5100 p.p.m. w., and at the end of 45 minute process period, propylene yield was 21.0% w. with 1.7% w. $C_1$–$C_2$.

We claim as our invention:

1. In the process of preparing an olefin of from two to five carbon atoms by contacting the corresponding paraffin in the vapor phase at 500–650° C. together with added hydrogen with a sulfided catalyst containing from about 0.01 to 5% by weight platinum under dehydrogenating conditions, the improvement which comprises using a catalyst of platinum on silica having a surface area of from about 300 to 750 square meters per gram which has been sulfided by maintaining from about 3000 to 6000 p.p.m. of sulfur in the paraffin feed to the catalyst reaction zone during the initial heating to operating temperature of a charge of unsulfided catalyst and then adjusting the concentration of sulfur in the feed to from about 300 to 2000 p.p.m. to maintain the degree of catalyst sulfiding.

References Cited

UNITED STATES PATENTS

| | | | |
|---|---|---|---|
| 3,067,130 | 12/1962 | Baldwin et al. | 208—140 |
| 3,126,426 | 3/1964 | Turnquest et al. | 260—683.3 |
| 3,168,587 | 2/1965 | Michaels et al. | 260—683.3 |
| 3,224,962 | 12/1965 | Baldwin | 208—139 |
| 3,291,855 | 12/1966 | Haensel | 260—683.3 |
| 3,310,599 | 3/1967 | Haensel et al. | 260—683.3 |
| 3,315,008 | 4/1967 | Abell et al. | 260—683.3 |

DELBERT E. GANTZ, Primary Examiner.

G. E. SCHMITKONS, Assistant Examiner.

U.S. Cl. X.R.

208—134; 252—439, 460